(12) United States Patent
Albus et al.

(10) Patent No.: US 6,566,834 B1
(45) Date of Patent: May 20, 2003

(54) MODULAR SUSPENDED MANIPULATOR

(75) Inventors: James S. Albus, Kensington, MD (US); Roger V. Bostelman, Frederick, MD (US); Adam S. Jacoff, Rockville, MD (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 0 days.

(21) Appl. No.: 09/654,784

(22) Filed: Sep. 1, 2000

Related U.S. Application Data
(60) Provisional application No. 60/156,360, filed on Sep. 28, 1999.

(51) Int. Cl.[7] ............................. B66F 9/00; E02D 23/08
(52) U.S. Cl. ................... 318/568.2; 318/566; 405/191
(58) Field of Search ................... 318/560–696, 318/6, 10, 16; 405/191; 352/197, 243; 901/28, 29, 43, 14, 21, 48, 19, 27, 15; 212/159, 274

(56) References Cited

U.S. PATENT DOCUMENTS

| | | | | |
|---|---|---|---|---|
| 2,164,128 A | | 6/1939 | Medenwald | |
| 4,625,938 A | * | 12/1986 | Brown | 248/550 |
| 4,666,362 A | | 5/1987 | Landsberger et al. | |
| 4,683,773 A | * | 8/1987 | Diamond | 74/479 |
| 4,710,819 A | * | 12/1987 | Brown | 358/229 |
| 4,765,795 A | * | 8/1988 | Rebman | 414/680 |
| 4,883,184 A | * | 11/1989 | Albus | 212/146 |
| 5,053,687 A | * | 10/1991 | Merlet | 212/148 |
| 5,253,771 A | * | 10/1993 | Mikulas et al. | 212/148 |
| 5,313,854 A | * | 5/1994 | Akeel | 74/479 BF |
| 5,408,407 A | * | 4/1995 | Lefkowitz et al. | 364/167.01 |
| 5,440,476 A | * | 8/1995 | Lefkowitz et al. | 364/167.01 |
| 5,507,596 A | * | 4/1996 | Bostelman et al. | 405/191 |
| 5,585,707 A | | 12/1996 | Thompson et al. | |
| 5,653,066 A | * | 8/1997 | Schildge, Jr. | 52/66 |
| 5,848,499 A | * | 12/1998 | Schildge, Jr. | 52/66 |
| 5,916,328 A | * | 6/1999 | Pritschow et al. | 74/490.03 |
| 6,126,023 A | * | 10/2000 | Durran-Whyte et al. | 212/274 |

* cited by examiner

Primary Examiner—Khanh Dang
(74) Attorney, Agent, or Firm—Stevens, Davis, Miller & Mosher, LLP

(57) ABSTRACT

A cable-driven manipulator can precisely manipulate tools and loads using position, velocity and force control modes. The manipulator includes a plurality of cables (2 or more) that are independently controlled by modular, winch drive-mechanisms and coordinated to achieve intuitive manipulator movement in all six degrees-of-freedom. The manipulator consisting of modular sub-assemblies and components (i.e. winch, amplifier, servo interface, sensory feedback), can be rapidly reconfigured to adjust to new applications. Various combinations of manual and automatic control can also be implemented. The winches can be controlled manually by a multi-axis joystick, or can be automatically controlled by computer.

20 Claims, 18 Drawing Sheets

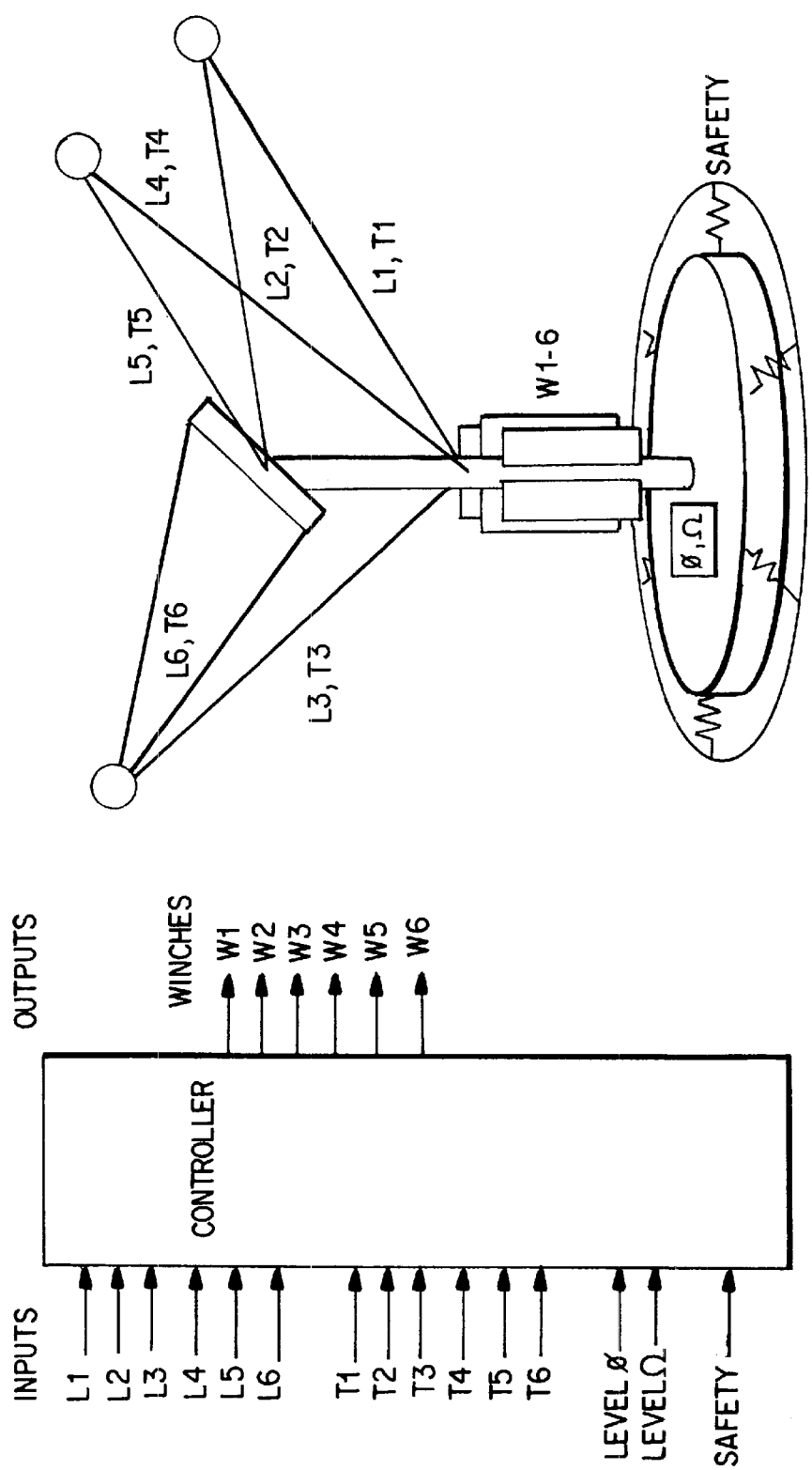

MODULAR SUSPENDED MANIPULATOR

This application claims the priority of prior U.S. provisional application No. 60/156,360, filed Sep. 28, 1999, the disclosure of which is expressly incorporated by reference herein.

BACKGROUND OF THE INVENTION

1. Field of the Invention

The Intelligent Systems Division (ISD) has been developing the Stewart Platform parallel-link manipulator for several years. Throughout this development, the ISD has considered a wide variety of cable and support structure configurations within the "RoboCrane" program. These configurations have been designed to specifically target applications in large-scale manufacturing, waste storage tank remediation, construction, military, and many other applications.

The RoboCrane can control suspended loads, tools and equipment in all six degrees-of-freedom(DOF) without sway or rotations typical of cable suspended systems(e.g., cranes). A spine can be integrated between the platform and support structure to provide constrained motions outside of the typical gravity-forced platform work-volume(e.g., the platform can be pushed to the side using a spine, instead of hanging beneath the upper support points). Control means include independent control of each RoboCrane cable, via a winch and powered by a power amplifier. A computer is used to determine the amount of cable-length to shorten or lengthen based on sensor inputs. As cable lengths are changed, the suspended platform remains fully controllable throughout a very large work volume. This concept is atypical of most robots. Joystick or other computer algorithm commands sent to the RoboCrane can provide complex platform motions controlled throughout the RoboCrane work volume. Pre-programmed trajectories allow the operator to pre-plan RoboCrane motions with updated path information based on sensory interaction with the environment (e.g. maneuvering around an obstacle that was placed in the pre-programmed path of the platform).

The idea of the novel cable configuration from shallow attachment points and modular-configured RoboCrane was first designed and reduced to practice in February 1998. The invention was disclosed to Advanced Technology and Research Corporation (ATR) in a meeting to discuss their interest in reducing the invention to practice on Nov. 9, 1998. A non-disclosure agreement was signed by ATR regarding the invention.

The invention has been publicly disclosed to industry and government participants at an Advanced Double-Hull Shipbuilding Demonstration at the National Institute of Standards and Technology (NIST) on Dec. 3, 1998 and to industry and government participants at a Paint/Depaint Workshop in San Antonio, Tex. on Jan. 12, 1999.

2. Description of Related Art

U.S. Pat. No. 4,666,362 to Landsberger et al. (1987) relates to a Stewart Platform parallel-link manipulator configuration of 6 cables, attached in a "tripod" configuration, including a telescoping support spine for the moving platform. Controlling power and motors are hydraulic. Cable lengths are independently controlled via powered spools.

Relevant to the proposed invention, this patent does not claim computer control or sensor integration.

U.S. Pat. No 4,883,184 to Albus (1989) relates to a Stewart Platform parallel-link manipulator configuration of 6 cables attached to a crane with the single crane winch as the lift device of all 6 cables. Cables control attached loads in 6 DOF.

Relevant to the proposed invention, this patent does not claim independent cable length control or sensor integration.

U.S. Pat. No. 5,585,707 to Thompson et al. relates to a tendon suspended platform robot. Claims 1–21 of this patent relate to cable-driven systems suspended from above and tensioned from below as well. Claims 22 through 34 of this patent relate to a cable-driven system suspended from above providing 6 DOF platform motion, on-board winches, position sensing, optical tension sensing, and a controller.

Relevant to the proposed invention, this patent does not claim control using tension feedback from a variable sensor, reconfigurability and adaptability of the suspended platform with a winch, control, and sensor package, various cable configurations with, specifically, 6 and 9 cables providing tendons and platform strength only where needed, or a tension control algorithm to damp platform oscillations, typically due to long cable lengths.

SUMMARY OF THE INVENTION

Based on this prior work and ISD research, the RoboCrane includes a variety of configurations and control methods. The new challenge was to create a means for modular robot reconfigurability, simple set-up and calibration, and suspending a moving platform that can carry a robot manipulator or a human worker, or both, throughout a large work volume. Also, the platform needs to apply forces and torques along typical work-volume edges allowing tool control near the attachment points, as well as to be suspended from shallow and widely spaced attachment points without driving cable tensions to exponential extremes.

According to the present invention, these challenges are met by a particularly constructed modular manipulator. The manipulator includes a servo module having a plurality of winches, with corresponding servo axes and winch support structure, sensors, and drive mechanisms by which the winches are independently controlled, and a support which can be suspended from attachment points and which can be positioned at various locations below the attachment points. The winch support structure is attached to the support, and a plurality of cables extends between the attachment points and the winches so as to suspend and position the support below the attachment points. The cables are wound up by and unwound from the winches to position the support at a selected location below the attachment points. The servo module is one of a plurality of servo modules providing for reconfiguration of the servo axes and a variety of cable configurations.

Six, seven, or nine cables may be provided, and the support can be either a platform, with or without a spine, or a spine and a spine bar.

In one configuration, a support spine extends from the platform, nine cables are provided, and three of the nine cables are connected to the support spine to provide added platform constraint. In another configuration, the support is a spine and a spine bar, seven cables are provided, and one cable pair from the seven cables is attached to the spine bar.

The sensors can include absolute position, velocity, and tension sensors, with the tension sensors detecting cable tensions in respective cables. Each tension sensor can be disposed either between the platform and a pulley about which one of the cables passes or between the winch support structure and a winch housing so as to sense cable tension approximately in-line with a respective one of the cables.

A set up and calibration operation can be performed by positioning the platform within a work volume with the cables unwound from the winches to initial cable lengths, setting the cable tensions so that they do not exceed a specified force while being unwound by an operator, connecting a first set of the cables to a first of the attachment points, connecting a second set of the cables to a second of the attachment points, connecting a third set of the cables to a third of the attachment points, and operating the winches so as to raise the platform up off a floor of the work volume. Platform angle and distance values are then input into the controller, and a position of the platform within the work volume is determined from these values.

The drive mechanisms include, for each cable, a winch motor and a brake. A computer reads a desired load velocity and signals from the sensors, combines the desired load velocity with these signals, and computes commands for the winch motor and the brake. This results in production of a desired winch velocity.

The attachment points can be disposed, for example, on any of walls, ceilings, support structures, cranes, bridges, and radio towers. A tool can be attached to an end of a support spine, when such is used, so as to be maneuverable into close tolerance areas. Finally, the manipulator may include an operator interface permitting entry of operator override commands.

BRIEF DESCRIPTION OF THE DRAWINGS

FIGS. 15A and 15B show a control configuration for a 7-cable system with various inputs to and outputs from a controller.

DESCRIPTION OF THE PREFERRED EMBODIMENTS

Figure 1:
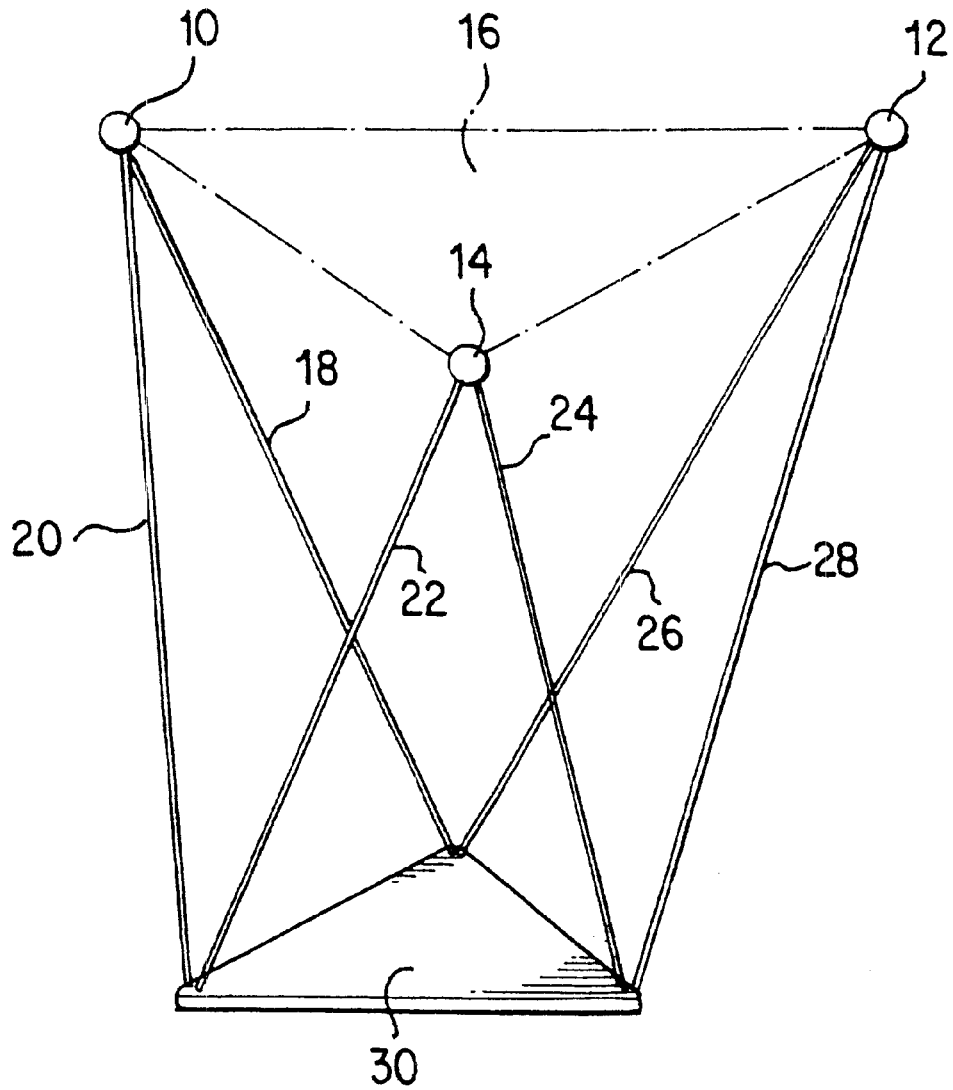
FIG. 1 shows a basic Stewart Platform, 6-cable configuration according to the present invention.

1. Among the salient features of this invention are a variety of cable configurations that can provide a stable and rigid work platform that can be positioned anywhere within a large work volume. All 6-, 7-, and 9-cable systems provide the following features:

a) 6 degree-of-freedom platform control throughout a very large work volume;

b) a work volume constrained by the upper support points and the depth of platform travel;

c) rigid support/precise maneuverability of small to large loads;

d) remote positioning of tools and equipment;

e) execution of precise motions with tools and equipment to accomplish complex tasks;

f) high lift-to-weight ratio (dependant upon design) using cables as tension members preloaded against gravity;

g) resistance to environmental perturbations;

h) accurate control of loads by a novice operator;

i) safe control and maneuverability of the platform since loads are controlled in full 6 Degrees of Freedom;

j) robotic control capability, including the following control types:
   Master/slave,
   Joystick input,
   Operator panel input,
   Preprogrammed trajectory following,
   Teach programming,
   Graphical off-line programming,
   Part programming, and
   Sensor based motion compensation; and k) multiple motion types, including:
   Single Joint,
   Cartesian base frame (default),
   Cartesian platform frame,
   Cartesian offset frame (tool center point),
   Constrained motions along vectors,
   Rotations about vectors, and
   Single axis force control.

Throughout the drawing figures, the same or similar components are indicated by the same or similar reference numbers, characters or designations.

The following 6-Cable, 9-Cable, and 7-Cable configurations add various differences and advantages as explained.

6-Cable System

Figure 2:
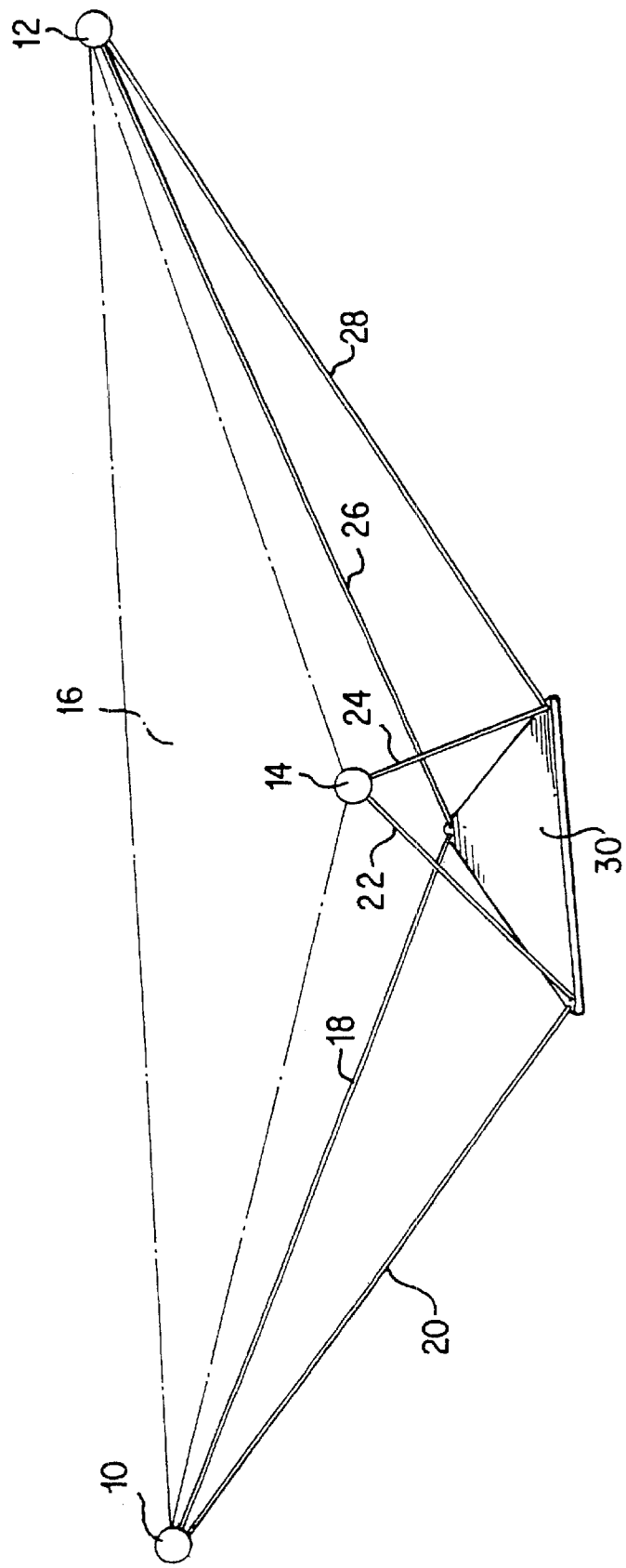
FIG. 2 shows the Stewart Platform configuration of FIG. 1 in a wide and shallow arrangement.

This configuration (see FIGS. 1 and 2) is well known in the art and is based on the Stewart Platform parallel link manipulator patented by Stewart, Lansberger, Albus, and others. The illustrated manipulator includes three attachment points 10, 12, 14 defining an upper base or triangle 16. It is a multipurpose manipulator that provides 6 DOF platform control throughout a large work volume that is constrained by the upper support points, although there is a problem with some shallow, wide work volumes. Six cables 18, 20, 22, 24, 26, 28 in a Stewart Platform geometry support a work or moving platform 30. As the platform 30 raises, cable tensions increase without added platform constraint and the platform is continuously less constrained from pitch, roll, and z-axis motions.

Advantages of a 6-cable system include:
1. Narrow, deep configuration and wide shallow configuration with limited rotational stability;
2. Minimal independent servo control points;
3. Well-known inverse kinematics; and
4. Additional weight-to-platform can increase stiffness and reaction forces for attached tools and equipment. This becomes more and more limited when nearing the wide, shallow configuration (i.e., as cables approach the horizontal plane).

9-Cable System

The 9-cable system includes attachment points 10a, 12a, 14a defining an upper base or triangle 16a in a manner similar to the previously described 6-cable system. The 9-cable system also includes six cables 18a, 20a, 22a, 24a, 26a, 28a which support a work or moving platform 30a in a manner similar to the 6-cable system. Thus, this system is an adaptation of the above 6-cable system, but includes an added support spine 32a as well (see FIG. 3A). The spine 32a is used to provide additional platform constraint. By pulling equally on the spine cables 34a, 36a, 38a, the platform 30a is constrained from pitch and roll and z-axis motions. Increased angles over the 6-cable ±30° constrained rotations are also possible with the spine addition. Angles of ±80° can theoretically be reached in some orientations and near the work volume edge (see FIG. 3B).

Advantages of a 9-cable system include:
1. Addition of a support spine to the 6-cable system for wide, shallow configuration; for example, the system can be attached to the walls (30' spaced) of a low ceiling height (15') room;
2. 3 spine cables provide increased platform rotation angles with platform constraint; and
3. 3 additional spine cables can be programmed to provide only tension control. The spine, therefore, pre-loads the platform to increase stiffness without adding weight to the platform.

7-Cable System

Figure 4A:
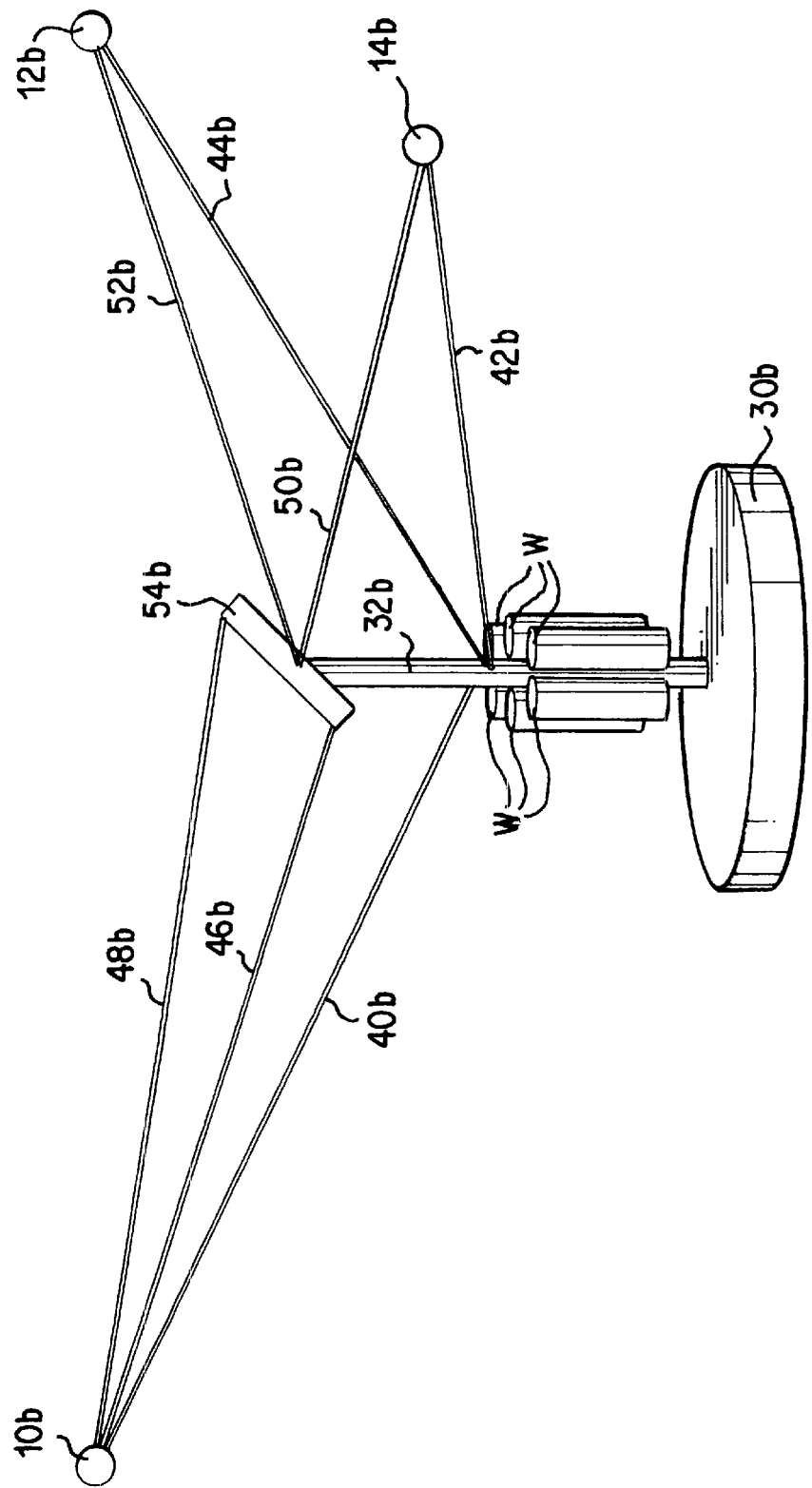
FIG. 4A shows a 7-cable system configuration according to the present invention.
Figure 4B:
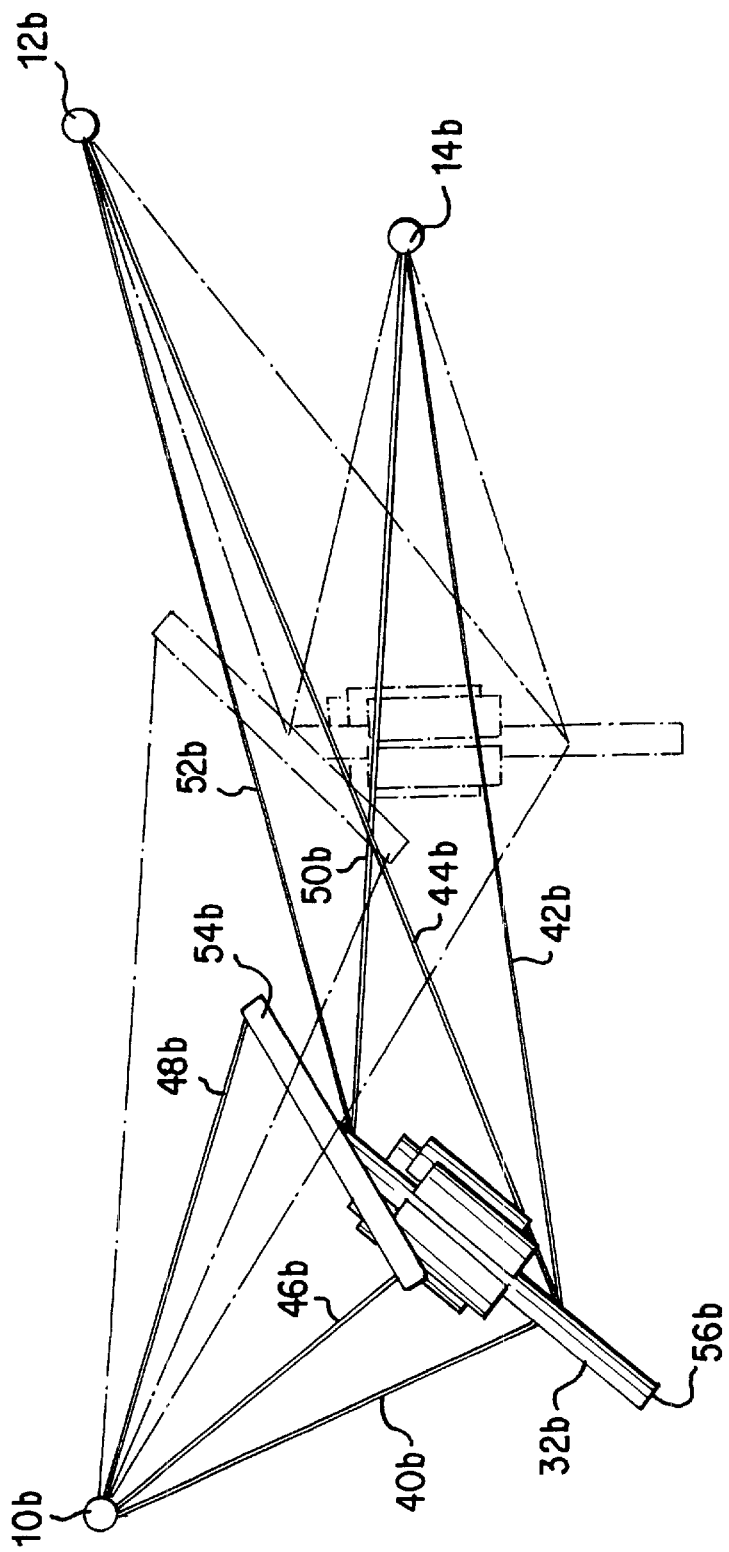
FIG. 4B shows a 7-cable system according to the invention when pitch-rotated and without a platform.

The 7-cable system includes attachment points 10b, 12b, 14b and, as shown in FIG. 4A, may include a platform 30b. However, the 7-cable system is configured differently from the 6- and 9-cable systems shown in FIGS. 4A and 4B. This system can use 6 or 7 actuators (winches) W to spool cables 40b, 42b, 44b, 46b, 48b, 50b, 52b; six such winches W are shown in FIGS. 4A and 4B. The cables are attached to a spine 32b and a spine bar 54b instead of the platform 30b of FIG. 4A, eliminating the need for additional cables.

Advantages of a 7-cable system include:
1. Addition of a spine for wide, shallow attachment to support structures;
2. 3 spine attached cables (cable pair attached to spine bar can be spooled on the same winch) and 3 platform attached cables;
3. Spine bar cable pair resists yaw rotations of the spine/platform;
4. Cables can be attached above the platform for clear worker or tool access to target work areas; and
5. Tools can be attached to the spine end 56b (FIG. 4B) and maneuvered into close tolerance areas (e.g., between beams, panels, equipment) with no platform blocking access.

2. Also among the salient features of the invention are the variety of cable attachment points that can support the cable configurations.

FIGS. 1, 2, 3A–3B, and 4A–4B show the narrow and wide spaced configurations that are possible. One 6-cable working prototype developed was attached to the trolley of a bridge-trolley crane. More specifically, a 6-cable working RoboCrane prototype was attached to the trolley of a bridge-trolley crane trolley and used for maneuvering a mock-up weld platform. Other models which have been developed, namely $1/72^{nd}$ scale static models of the wide 9- and 7-cable configurations, were attached to a model aircraft hangar.

3. Another feature of this invention is a modular packaging of winch components, cable routing, and tension sensors that can allow the system to be configured with a variety of cable configurations.

Figure 5:
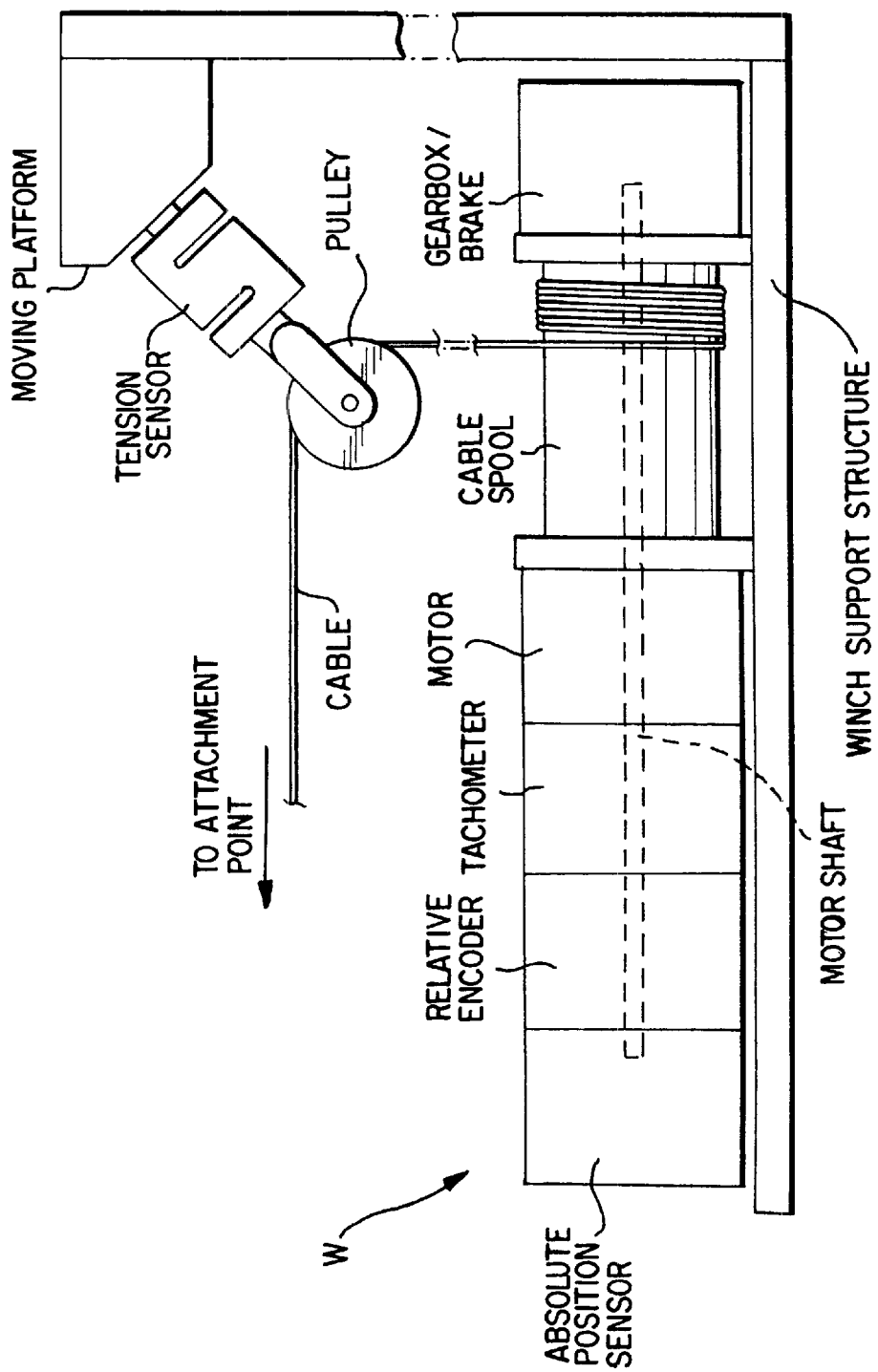
FIG. 5 is a side view of a winch module block diagram showing sensor locations.
Figure 6:
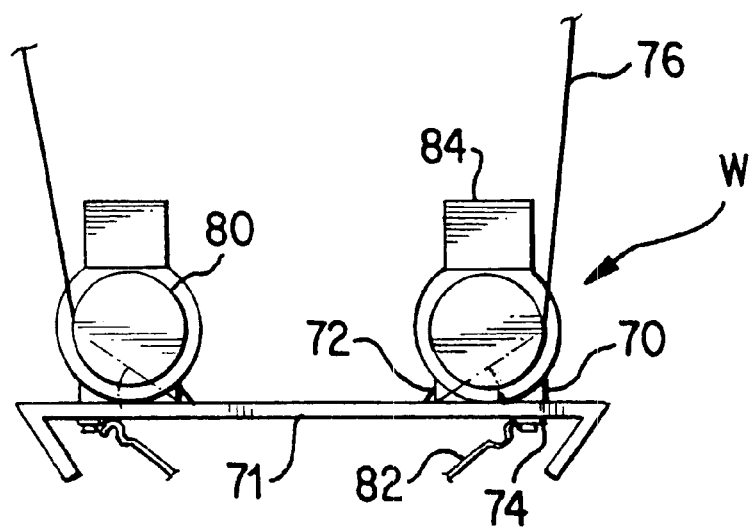
FIG. 6 is an illustration of an alternative tension sensor mounting scheme.
Figure 7A:
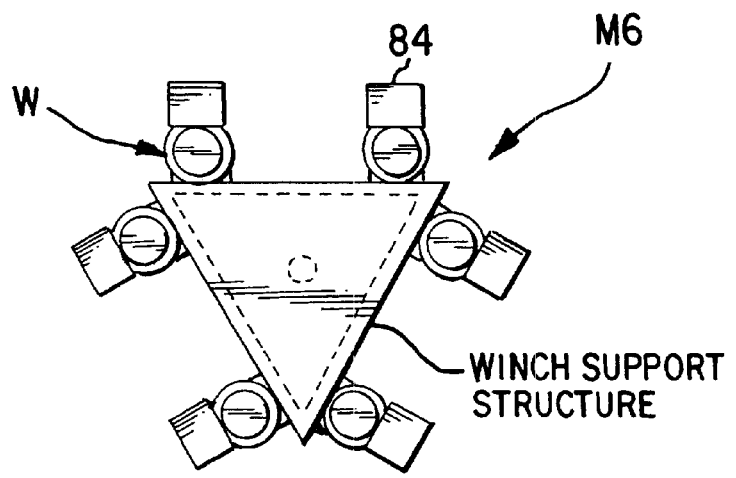
FIGS. 7A and 7B show basic, combined, servo-level modules for six axes and nine axes, respectively.
Figure 7B:
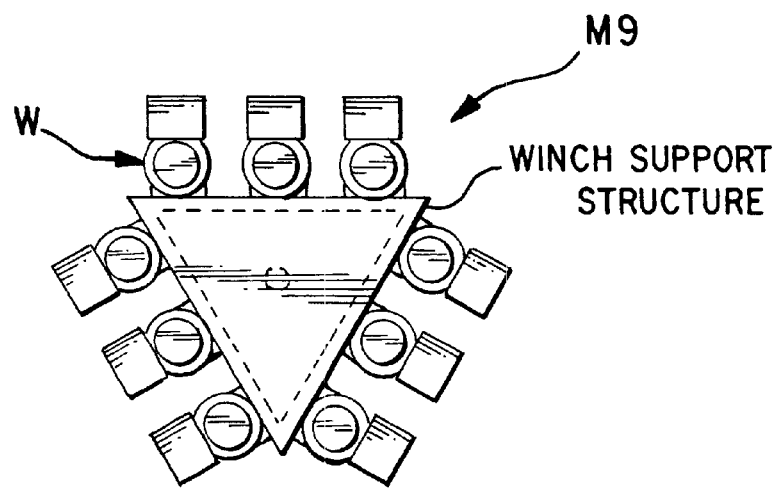
Figure 8:
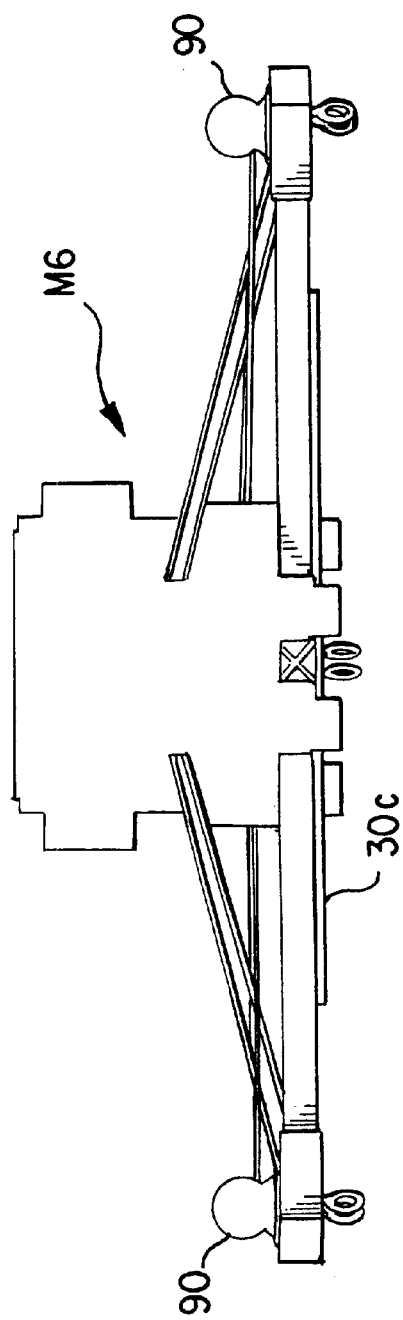
FIG. 8 is a platform side view of a basic configuration according to the invention including a 6-axis servo module and frame.
Figure 9A:
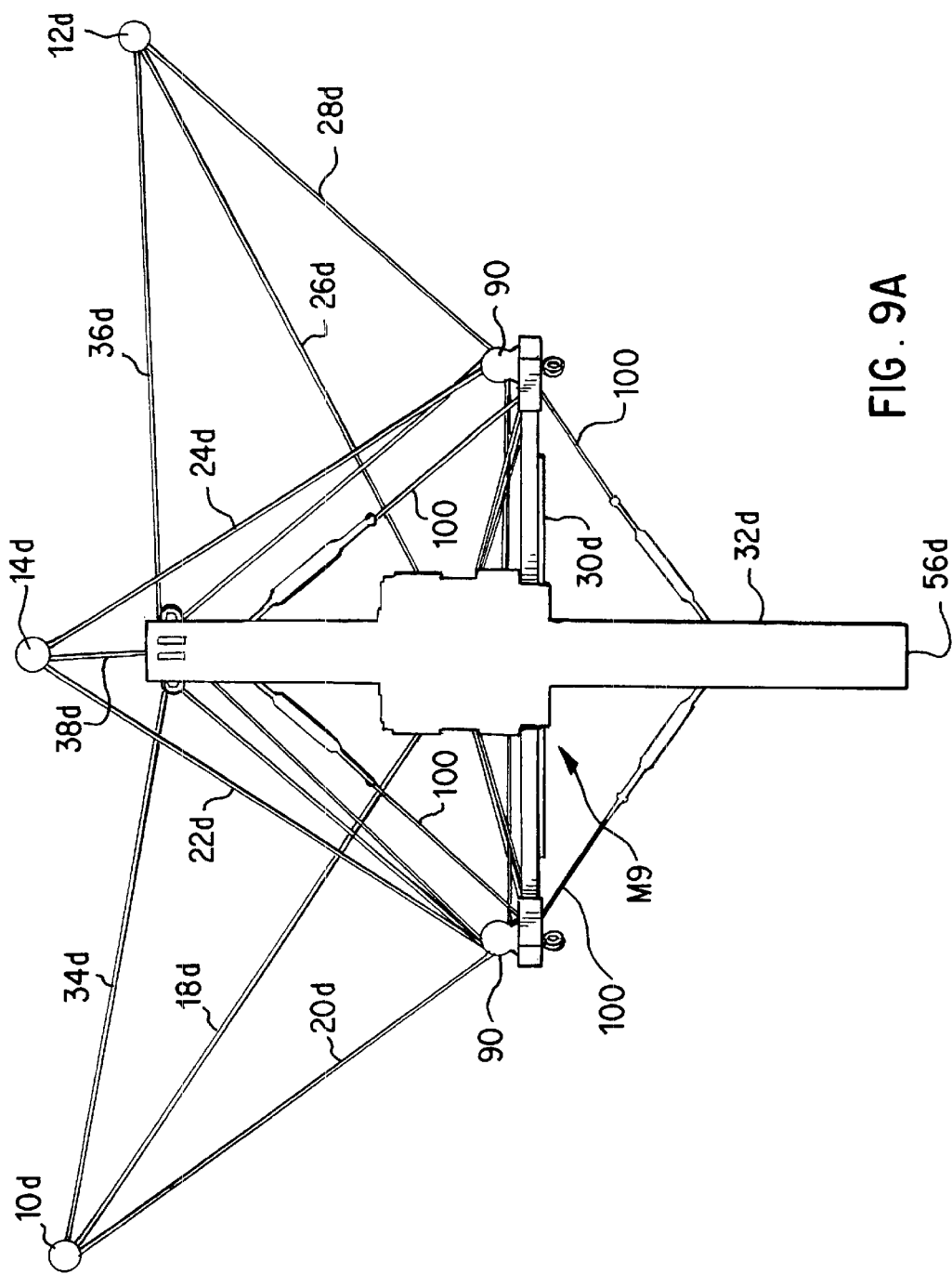
FIG. 9A is a modular platform side view in a spine configuration including a 9-axis servo module and frame.
Figure 9B:
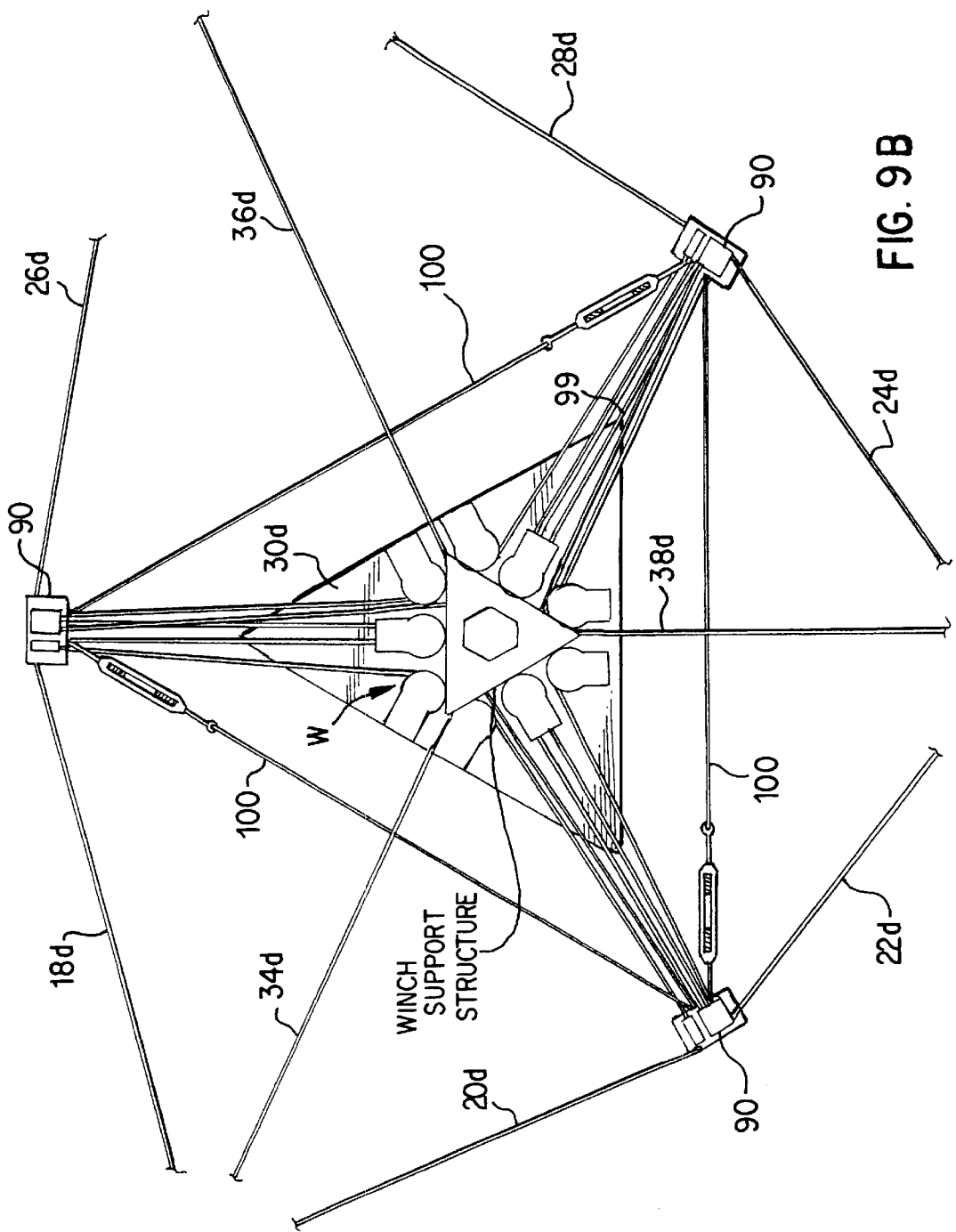
FIG. 9B is a top view of the configuration shown in FIG. 9A.

FIGS. 5 and 6 show a block diagram of the winch and sensor configuration and an alternative tension sensing method, respectively. FIGS. 7A and 7B show the basic, combined, modular winch/sensor package for 6 and 9 winches W, respectively. FIG. 8 shows the 6 axis module installed into a platform for use in narrow, tall attachment configurations. FIGS. 9A and 9B show side and top views, respectively, of the modular platform with a spine used in wide, shallow attachment configurations.

FIG. 6 shows the alternative tension sensor (load washer) mounting scheme. In this compact configuration, the winch housing 70 is hinged, by way of a hinge 72 on one side, to a portion 71 of the winch support structure while a load washer 74 senses cable tension nearly in-line with the mechanical cable 76. Relative and/or absolute position and velocity (tach) sensors are embedded and attached to the winch shaft 80. A line 82 leads from each load washer 74 to a signal conditioning amplifier (not shown in FIG. 6). An amplifier/servo interface 84 is provided for each winch W.

FIGS. 7A and 7B show the basic, combined, servo-level module for six axes and for nine axes, respectively. The six-axis servo-level module M6 shown in FIG. 7A includes six winches W, amplifier/servo interfaces 84, position and velocity sensors (not shown), and tension sensors. This module also includes a winch support structure that attaches to the associated moving platform. The nine-axis servo-level module M9 shown in FIG. 7B is similarly constructed but has nine winches W.

The platform side view of FIG. 8 schematically shows a basic configuration including a 6-axis servo module M6 and a work or moving platform 30c for use mainly in tall, narrow attachment configurations. The servo module M6 with six winch/sensor axes, amplifier, and servo interface is attached to the winch support structure. This winch support structure, in turn, attaches to the work or moving platform. Pulley sets 90 are disposed on the frame of the work or moving platform 30c.

FIGS. 9A and 9B show modular platform side (FIG. 9A) and top (FIG. 9B) views, in a spine configuration, including a 9-axis servo module M9 and a frame 99 mounted on the work or moving platform 30d for use in wide, shallow attachment configurations. The spine does not have to protrude below the frame.

Figure 3A:
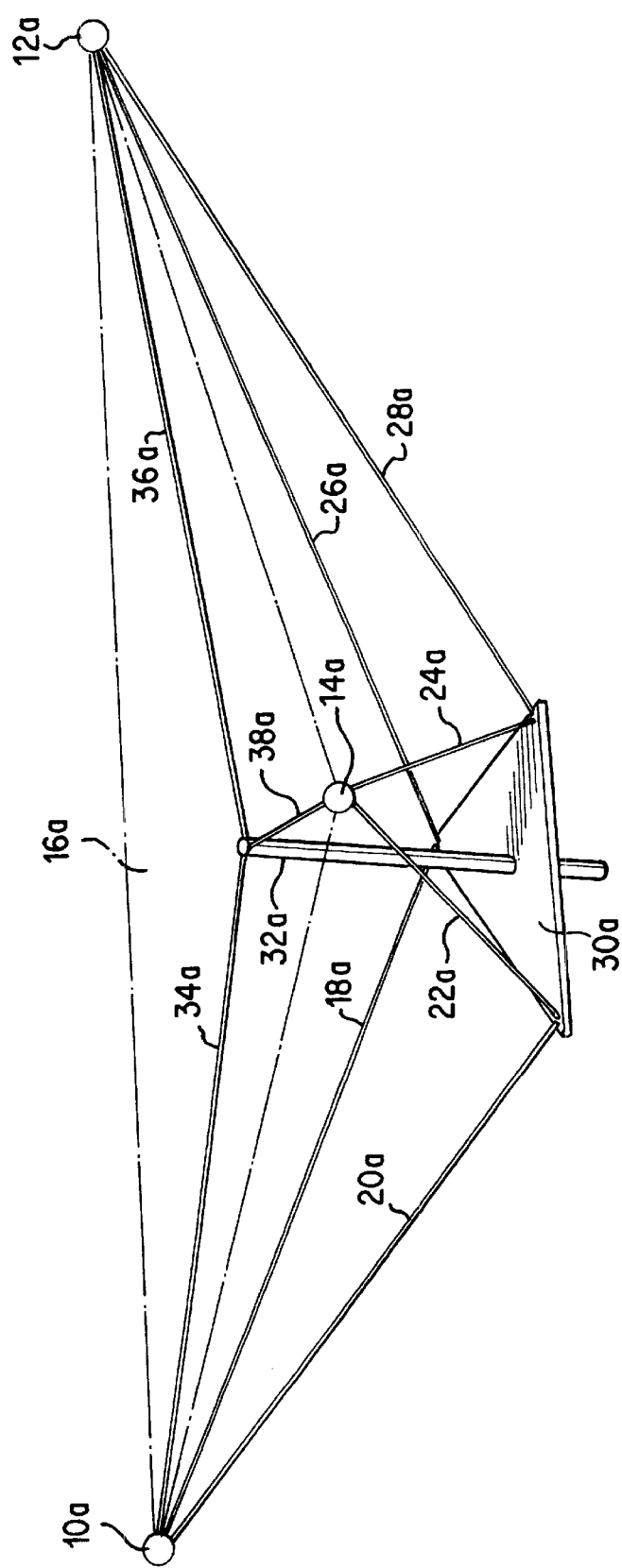
FIG. 3A shows a 9-cable system according to the present invention.
Figure 3B:
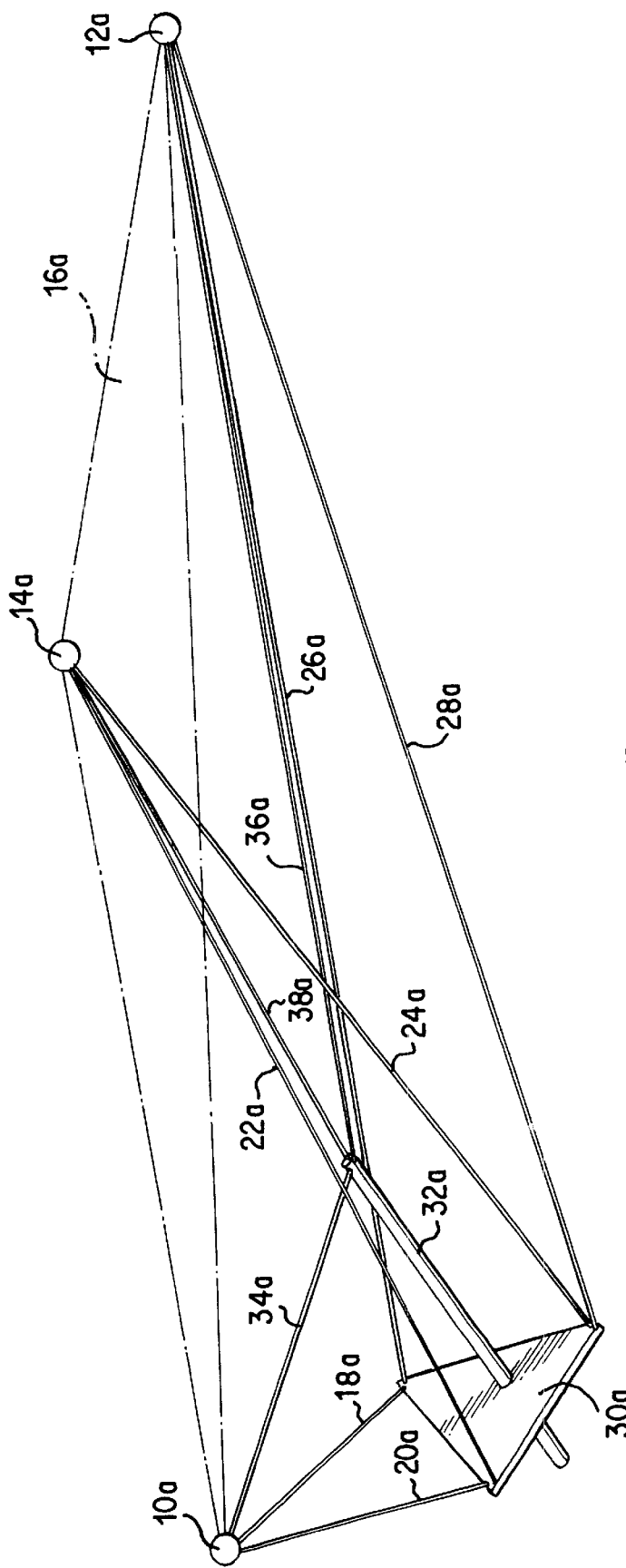
FIG. 3B shows the system of FIG. 3A when pitch-rotated beyond the typical ±30° angle.

The arrangement represented in FIGS. 9A and 9B includes three attachment points 10d, 12d, 14d forming an upper or base triangle in a manner similar to the arrangement represented in FIGS. 3A and 3B. The arrangement shown in FIGS. 9A and 9B includes six cables 18d, 20d, 22d, 24d, 26d, 28d which support the work or moving platform 30d. Thus, the six cables are in a Stewart Platform geometry. The system of FIGS. 9A and 9B also includes an added support spine 32d and three spine cables 34d, 36d and 38d. A tool, equipment, and/or an end-effector may be attached to the spine end 56d shown in FIG. 9A.

The top view represented in FIG. 9B shows that the frame 99 with support cables 100 attached to the platform 30d supports 3 pulley sets 90; each pulley set has 3 pulleys for the cables leading thereto. FIG. 9B also shows the locations of the winches W on the winch support structure, which is indicated only in FIG. 9B. The servo module M9 shown in FIGS. 9A and 9B has winch sensors (9 each), attached amplifier, and servo interface.

4. Another feature of the invention relates to a calibration procedure that can reduce set-up time.

SET-UP AND CALIBRATION PROCEDURE:

a) Information regarding the platform configuration has been preloaded into the controller including platform size, cable attachment height above the platform cable points, and platform tilt. A basic Stewart Platform arrangement of parallel links (cables) attached to the platform is understood and ready for attachment to support structure in a Stewart Platform configuration.

b) Position platform within three potential attachment points with cables spooled to a known INITIAL length.

c) Power system on.

d) Set control mode to JOG (allows independent winches to be controlled from a velocity control) and set tensions to a 5 or less pounds-force. This allows tensions to keep the cables taut while an operator can still pay out cables by simply pulling on them. Also, this mode allows the platform to be readjusted by pushing or pulling on the platform.

e) Choose potential attachment points such that they nearly form an imaginary triangle above the floor (base) access points.

f) JOG winch 1 (any chosen winch) allowing cable to be pulled by an operator and connected to a chosen attachment point 1.

g) JOG winch 2 (winch cable that must be co-located with winch 1) and attach to chosen attachment point 1.

h) JOG winch 3 (spine winch cable that must be co-located with winch 1) and attach to chosen attachment point 1.

i) Repeat steps ee through gg for the remaining winches and attachment points.

j) Switch control to TENSION control of all winches and tighten all winches slowly until the platform raises from the floor.

k) Switch control to POSITION control of all winches.

l) Measure the platform angle relative to the horizontal plane. This can be an automatic function with an onboard tilt sensor. Input these values into the controller.

m) Measure the distance between upper attachment points. Input these values into the controller. This can be an automatic function as the system knows a relative cable length based on its INITIAL cable length spooled from the winch. With knowledge of the 6 platform lengths relative to the INITIAL lengths, known Stewart Platform kinematic equations can be applied to determine where the platform is within the work volume. Since the platform rests below the attachment points, the mirrored position (platform above the attachment points) singularity is automatically eliminated.

The system is now calibrated with respect to the attachment points.

(n) To calibrate the system with respect to a known calibration or metrology system:

A calibration system, including a line with known length and orientation, can be installed within the work volume.

The platform can be controlled using JOYSTICK mode, where all winches are controlled simultaneously, to one end of the calibration line. Insert this location point into the controller (e.g., push a button that automatically logs the point into the controller).

Repeat the above step for the opposite line end.

With platform level and all cables tensioned to form a 6 DOF constrained system, the system is calibrated relative to the calibration line within the work volume.

Figure 10:
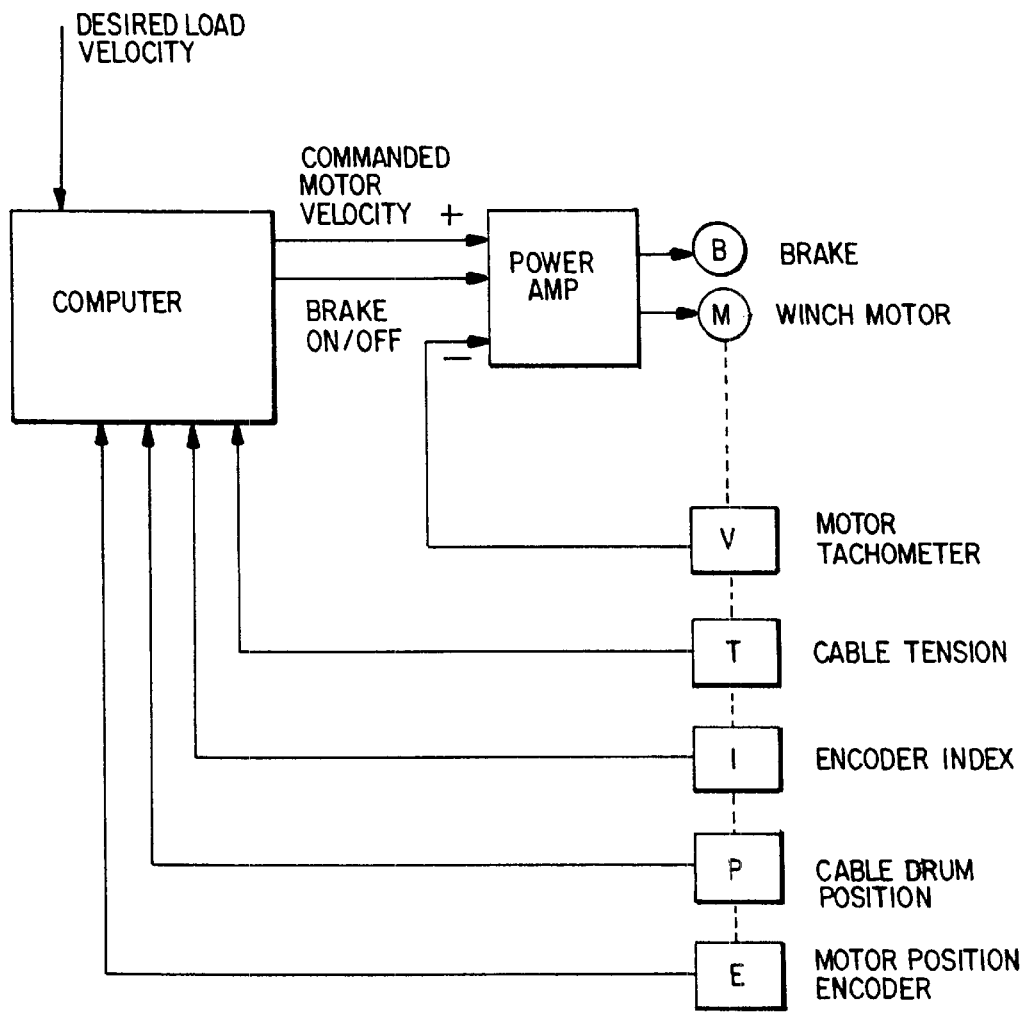
FIG. 10 is a schematic representation of a system which combines a desired load velocity with signals from five sensors to calculate a commanded winch motor velocity.

5. Yet another feature of the invention relates to a set of tension sensors and tension control methods for damping oscillations. For each cable, there is a winch motor and a brake to be controlled. There are also five sensors: 1) an encoder E that measures the angular position of the winch motor armature, 2) an encoder index I providing a zero reference pulse that indicates zero angle on the motor encoder, 3) a potentiometer P that measures the angular position of the cable reel, 4) a tachometer V that measures the angular velocity of the winch motor armature, and 5) a tensiometer T that measures the tension in the cable. This is illustrated in FIG. 10. A control algorithm in the computer shown in FIG. 10 combines a desired load velocity with signals from these five sensors to calculate the commanded winch motor velocity.

On each clock sample signal, the sensors are sampled, digitized, and read by the computer. In the computer, sensory processing and world modeling processes convert the sensor signals into estimated and predicted state-variables that can be used to plan and control the behavior of the winch and brake. A behavior generation process in the computer reads the desired velocity of the load from an operator interface, or from a higher level process in the computer controller, and computes the winch motor and brake commands required to produce the desired winch velocity.

The tachometer signal is typically fed directly back into the winch motor power amplifier, so that the motor will produce the commanded velocity.

A control problem arises from the fact that stretch and sag in the cables produces a spring constant that reacts with the mass of the load to create a harmonic oscillator. The six springy cables allow the load to oscillate in all six degrees of freedom.

Harmonic oscillations in the cables can be actively damped by the following formula:

Commanded_motor_velocity=$kv$ (desired_winch_velocity-measured_winch_velocity)—$ks$ (measured_cable_tension-$T0$), where $kv$ is a velocity gain factor, $ks$ is an active damping gain factor, $T0$ is the tension in the cable with zero oscillation, and $T0$ is also the average or mean tension in the cable with oscillation.

The $ks$ term causes the oscillation to damp. The value of $ks$ can be chosen to achieve optimal damping conditions.

6. Another feature of the invention is a method for using tension control to relieve over-constrained cable configurations.

The work platform has only six degrees of freedom. Thus, when there are more than six cables, the work platform becomes over-constrained. This problem can be solved by using the tension measurements to provide additional degrees of freedom. For example, the position of the platform can be defined by six of the cable lengths, and the tension in the remaining cables can be adjusted so that all cables remain in tension above some minimum value. The requirement that all cables remain in tension prevents any winch from ever spooling out slack cable. It also affects the work volume of the work platform.

7. Yet another feature of the invention is a control system architecture that can permit a variety of control methods including manual control, remote teleoperation, sensor controlled motion, and computer generated motions.

Figure 11:
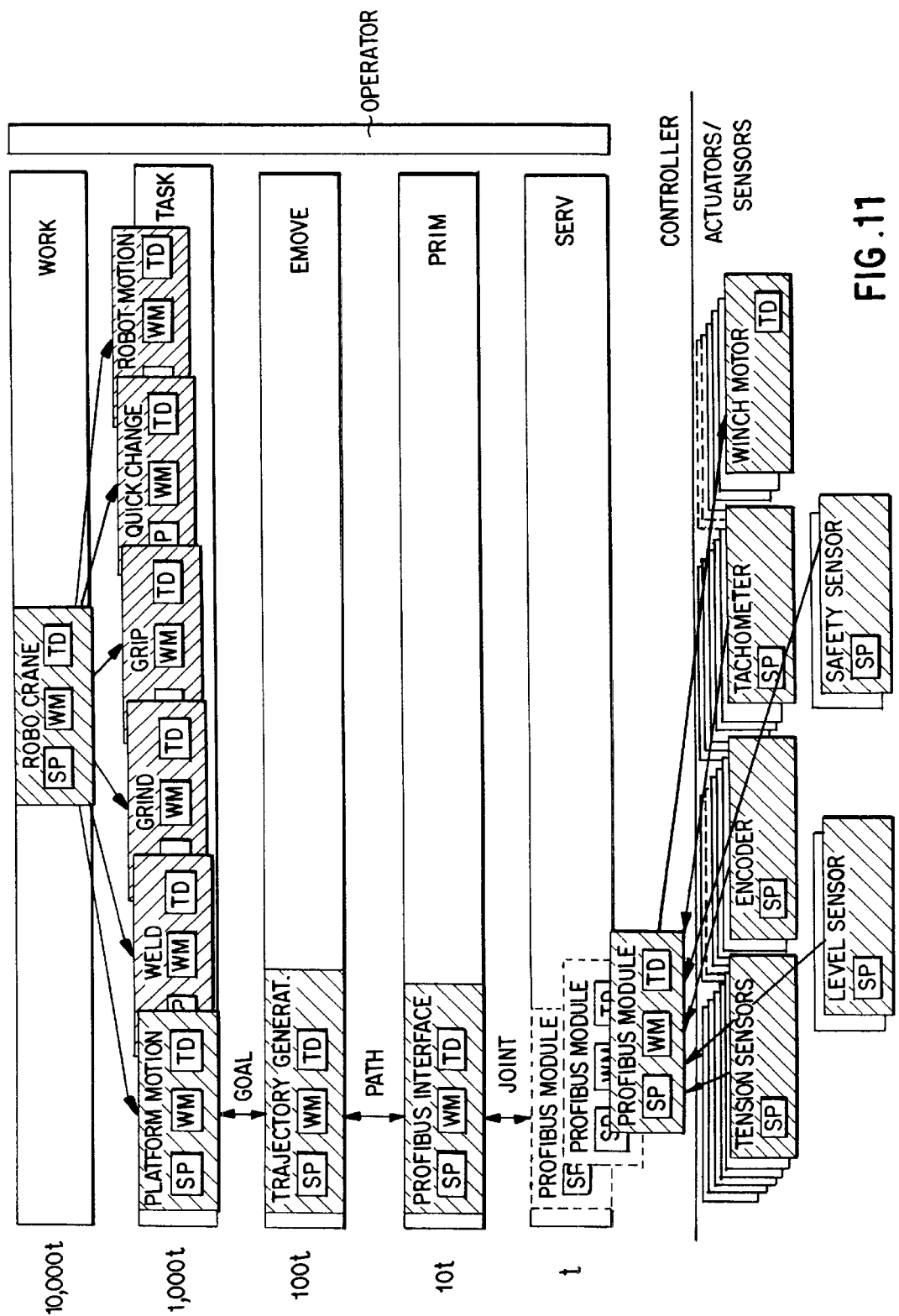
FIG. 11 shows Real-time Control System (RCS) architecture for the RoboCrane work platform.

The Real-time Control System (RCS) architecture used on the platform allows for modularity of control and follows the platform hardware modularity well. As servo components and/or sensors are added or deleted, the control architecture also allows for this change. FIG. 11 shows the RCS architecture for the RoboCrane work platform, the RCS hierarchical levels applied to the platform motion, and the high level interaction between levels. Other "tasks" can be assigned as shown, such welding, grinding, etc.

Sensory processing (SP), world modeling (WM), and task decomposition (TD) are applied to all control blocks at each level. SP processes input from sensors to estimate state-variables, to detect events, and to recognize entities and situations. The WM acts as a database server to keep a local knowledge database up to date for each TD process. WM provides information about the state of parts, tables, machines, and obstacles within the work volume. The WM also includes a simulator that can simulate the results of plans considered by the TD process at each level. This allows the TD process to plan and control and make intelligent real-time decisions at each level based on information in the knowledge database. Output from the servo level TD process commands to the robot actuators.

Within the actuators/sensors area, there are control interfaces for any desired number of robot sensors and actuators to be controlled. In the case of invention, 6 to 9 winches are used. With each added or deleted winch, an associated encoder, tachometer, and tension sensor is added or deleted, respectively. Other sensors can be added or deleted as well, such as level and safety sensors dependent upon the robot application.

An operator interface can be connected to any process at any level as desired, to enter operator override commands and mode changes, or to monitor state-variables at different points in the controller. A wide variety of operational modes can be supported, such as teleoperation, constrained motions relative to surfaces or lines, constraints on forces in various directions, computer generated path plans, and fully autonomous sensor controlled motion.

Figure 12:
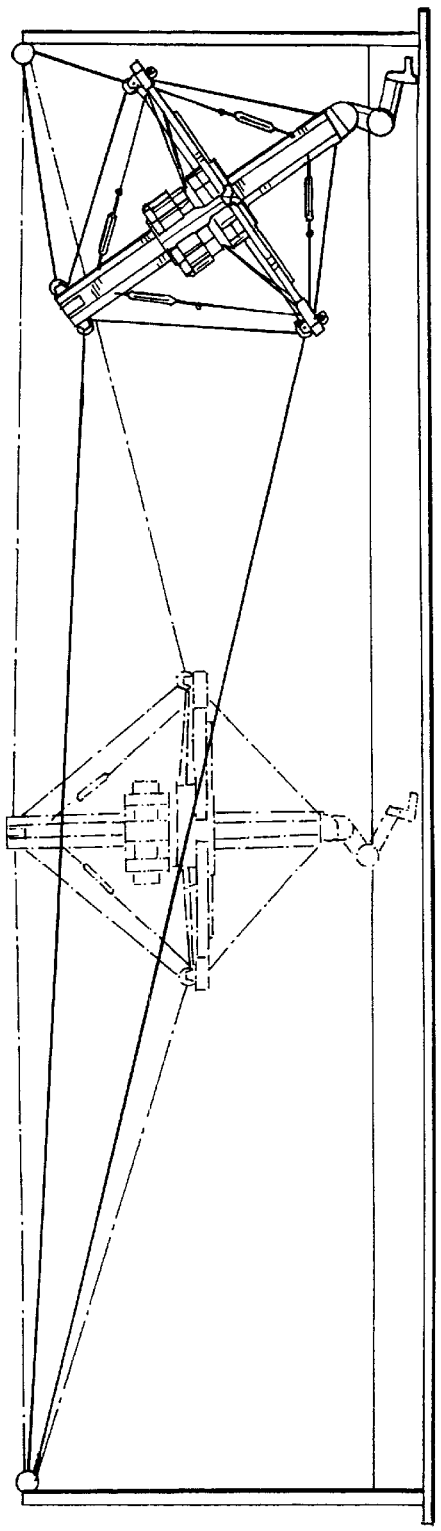
FIG. 12 is a schematic illustration of a 9-cable system according to the invention attached to a relatively shallow wall.
Figure 13:
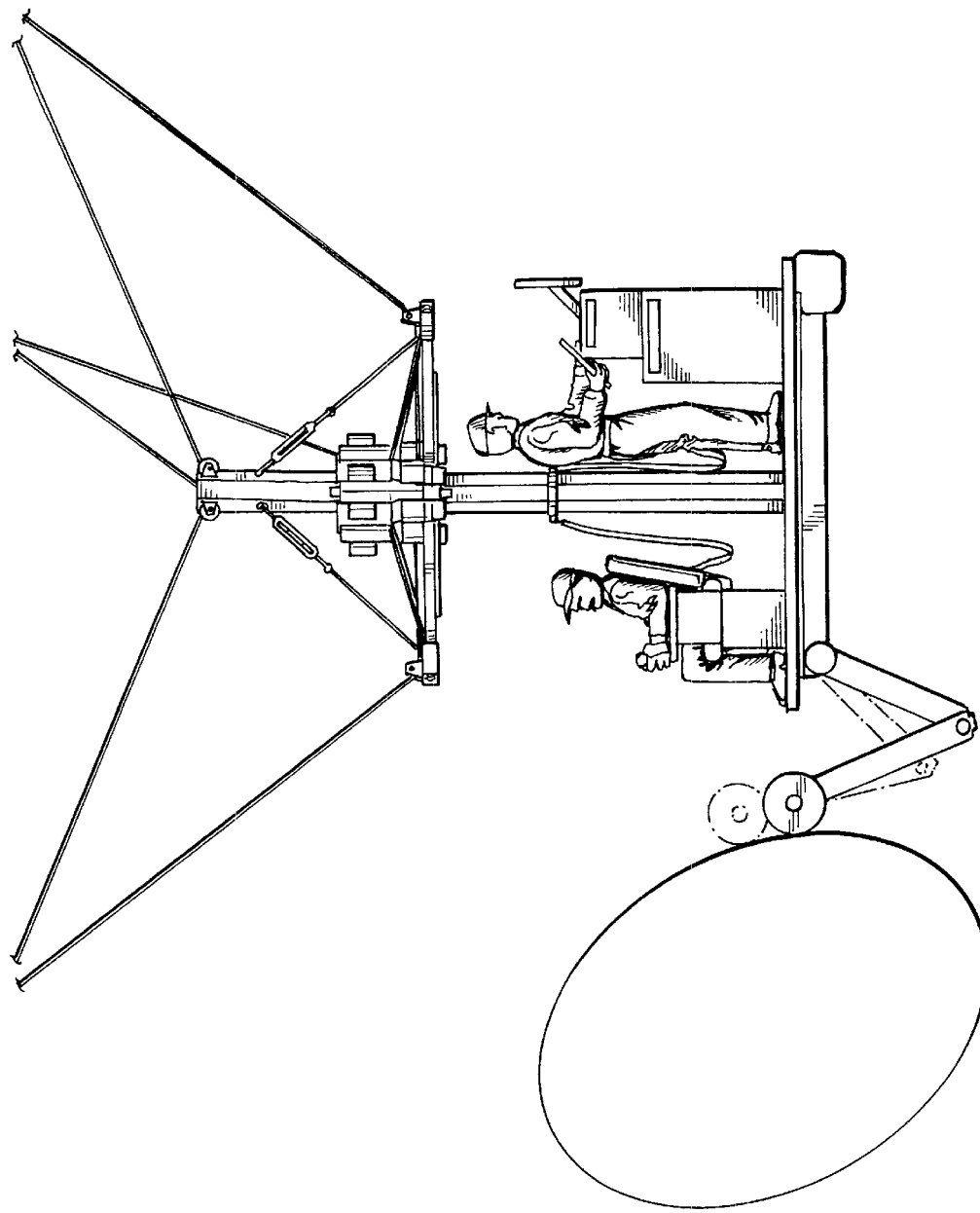
FIG. 13 is an illustration of a personnel/tool/manipulator carrier configuration.
Figure 14:
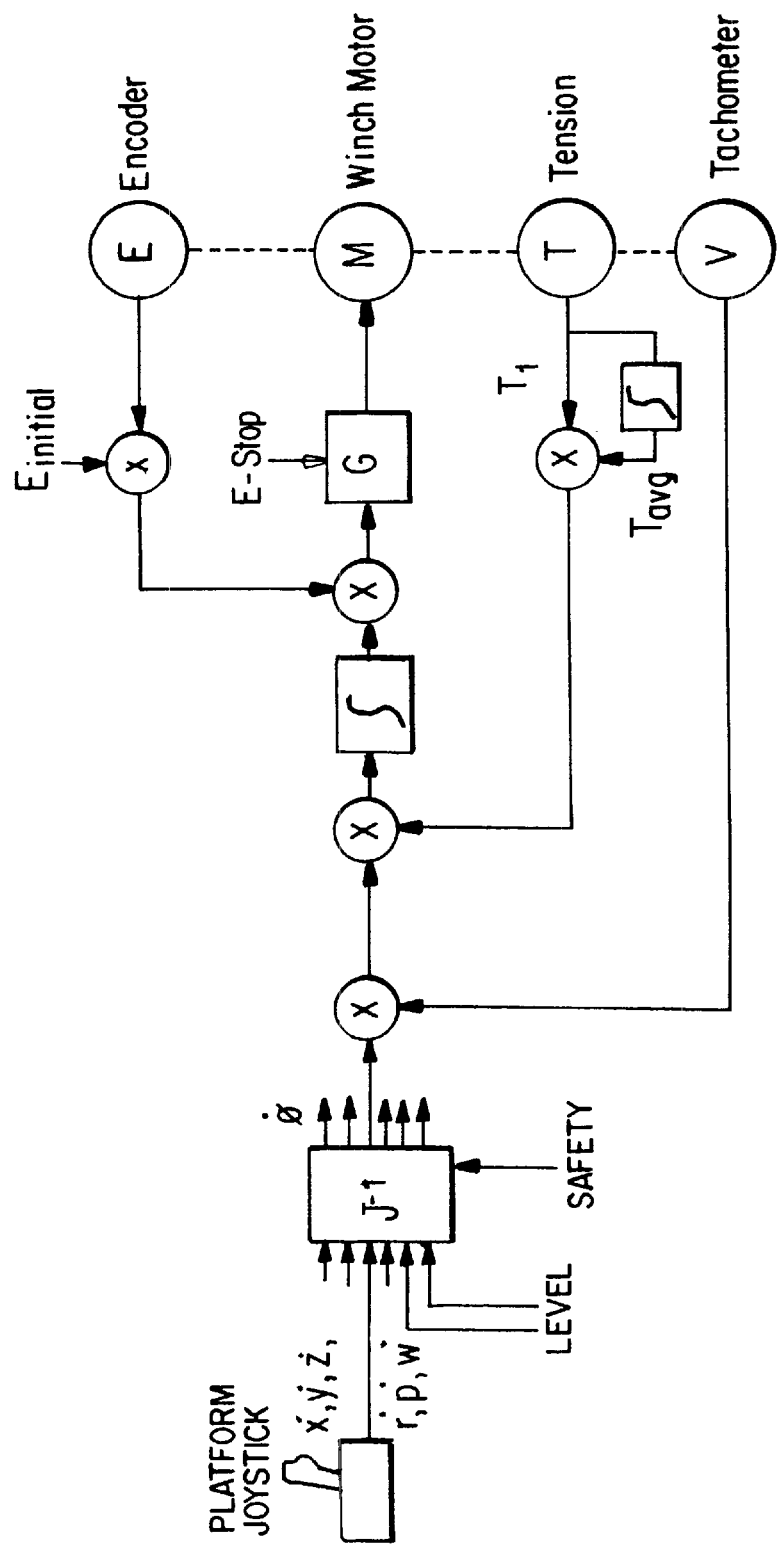
FIG. 14 is a circuit diagram showing tension control used for damping oscillations.

In order to explain the invention further, additional FIGS. 12, 13, 14, 15A and 15B are shown. FIG. 12 is a schematic drawing of the invention using a 9-cable configuration attached to a relatively shallow wall and capable of accessing the edges for ship stiffener welding, inspection, and other tasks. FIG. 13 is an illustration of a personnel/tool/manipulator carrier configuration, and FIG. 14 is a circuit diagram for damping oscillations using tension control. FIG. 14 shows a platform control for one of six to nine joints. In FIG. 14, x=x-axis,
y=y-axis,
z=z-axis,
r=roll, rotation about the x-axis,
p=pitch, rotation about the y-axis,
w=yaw, rotation about the z-axis,
$J^{-1}$=inverse jacobean, and
G=gain.

FIGS. 15A and 15B show an example of a high-level control configuration for a 7-cable system (see FIGS. 4A and 4B) with length, tension, level, and safety sensor inputs to the controller. Inputs L are cable lengths (encoder) and inputs T are from cable tension sensors.

Advantages and Differences

As in the previously disclosed research and development, the prior art RoboCrane is scalable, is lightweight and provides high strength-to-weight, can maneuver in all six degrees-of-freedom throughout large work volumes, can rotate to about <±45° in all three rotations, and can be controlled by manual and/or computer algorithms for velocity, position, and tension control with sensor integration. The following are differences with respect to these previously disclosed advantages of RoboCrane.

The new platform and cable configuration of the invention is a significant improvement with respect to the original Stewart Platform configuration and the prior art cited. With the addition of one or more servo axes, the system can resist forces and torques offset from the platform. For example, when attaching a suspended personnel carrier, cables attached to the platform above its plane provide torque resistance along the applied direction. Also, for large cable-angles (>60° with the vertical), additional servo axes can be easily integrated providing typically unavailable forces and torques at these angles (e.g., low ceiling applications). Additional rotation angles (to 80° or more), beyond the angles achieved by the Stewart-Platform arranged cable configuration (±45°), are also possible with the invention. Moving the platform center-of-gravity with moveable weights can provide even larger-angle controlled rotations.

The modularity of the invention provides not only work-volume reconfigurability but also enormous reconfigurability of the suspended platform. On-board winches and control means are demonstrated in Thompson's patent and therefore, cannot be claimed here. But, the modularity and reconfigurability of servo axes is new. By combining the number of necessary, controllable servo axes, the user can configure the invention exactly to the application.

The adaptability of the invention to existing superstructures allows a cost-effective alternative to robotic, tedious, and/or repetitious tasks. Attaching the invention to existing walls and superstructures allows no or minimal pre-process set-up and provides the ability to move the robot, tool, and/or equipment to new locations with minimal set-up time. No additional fixturing to floors or lower level structures beneath the platform is necessary. The invention provides maneuverability from above the work site where there is typically unused work-volumes. Typically, robots moving over large volumes require the procurement of a gantry or support system, as well. Gantries are heavy and typically require fastening to the floor (i.e., in a fixed position). Without a gantry, robots are bolted or clamped in place and have limited reach. The invention can attach to many structures, such as walls, ceilings, support structures, cranes, bridges, and radio towers covering a very large work volume. Therefore, the invention provides a lightweight alternative to manipulators currently available, providing minimal recalibration and set-up time.

Minimal recalibration of the invention can be achieved since the invention can be attached to superstructures at wide separation points relative to the platform size. Therefore, the robot need only be detached and reattached infrequently as compared to other serial manipulators or tools without a large gantry support structure straddling the work area. The robot could theoretically be calibrated by allowing spooled winch cables to be pulled out by a human or other means at light tensions, attaching the cables to a superstructure in a paired-or triple-cable arrangement, reading additional sensors (such as tilt) for platform rotation, and then calculating the kinematic configuration based on these sensed parameters. Potentially, the robot could automatically be calibrated quickly by a single worker.

Various control methods are possible to provide velocity, position, and tension control of the platform and attached tools and equipment. As previously disclosed, the RoboCrane is capable of these control modes. But, the difference disclosed here is that variable tension control is necessary due to the over-constrained cable configuration of using more than 6 cables and the necessity to reach points beneath or beyond the platform attachment points while maintaining a desired force or velocity. The prior disclosed methods do not or minimally allow these advantages. Control modes, such as teleoperative, semi-autonomous, and autonomous control, are possible with this new configuration as well. Therefore, control of a cable driven manipulator can be driven to precise locations with accuracy and repeatability similar to typical serial manipulators but with higher payloads. Force control capability should allow delicate maneuvering around obstacles, and should make the platform more useful for manipulation tasks. Forces can be sensed with conventional tension sensors for input to the controller during force control mode and to insure that cables remain in tension and/or that cables are not overloaded.

In order to study the cable configuration of this device, concept drawings were developed and mock-up platforms, including both small-scale and full-scale platforms, were built. Small-scale models were $\frac{1}{72}^{nd}$ scale-models. A full-scale mock-up of the invention, moreover, was developed and included an existing aluminum frame with a center spine and up to nine nylon ropes tied to walls and superstructures. A mock-up weld torch was attached to demonstrate the precision placement of an attached end-effector.

Another model depicted a personnel carrier used for aircraft maintenance suspended at a shallow depth from upper attachment points.

Another $\frac{1}{72}^{nd}$ scale model of the invention depicted a personnel carrier used for aircraft maintenance. This model had a different cable configuration than the previously mentioned designs including 4 upper cables and 3 lower cables. One pair of upper cables could be spooled on the same winch drum to eliminate one actuator.

In another full-scale mocked-up invention, the RoboCrane was attached to walls and available superstructures (at approximately 15 feet above the floor and approximately 40 feet apart between two points by 60 feet to the third point) using 9 cables. This mocked-up invention was able to reach beneath the upper attachment points (along an edge) and into a shelf unit with an attached mock-up weld tool.

Potential Applications
Originally-sited Applications:

Potential applications include originally-sited RoboCrane applications as mentioned below. Depending on what is suspended from the end of the arm (end-effector), the manipulator can perform a variety of tasks.

For Cutting,

The robot can manipulate a variety of saws (wire saw or disc saw), rotary cutting tools (router, milling tool, grinding tool), abrasive jet tools (water jet, air jet), flame cutters, or chiesels for cutting steel, plastics, or wood. The robot can produce large forces with accuracies sufficient for many types of machining operations, including milling, routing, drilling, grinding, and polishing.

For Excavating and Grading,

The robot can manipulate digging devices (digging tools, augers, scrapers) precisely over the ground in either a manual or computer controlled mode. By suspending the arm, dirt can be removed from a large volume with great precision.

For Shaping and Finishing,

The robot can manipulate grinders, polishers, buffers, paint sprayers, sandblasters, and welding torches over large objects (ship hulls, structural steel, casings and weldments, concrete structures). It can apply controlled amounts of force and resist perturbations in all directions.

For Lifting and Positioning,

The robot can be fitted with a variety of gripping devices to lift and precisely position loads. The robot can exert controlled forces to mate and seat loads and can resist perturbations such as wind and inertial forces. Vaccum, water and/or air hoses can also be manipulated for removing materials from surfaces and tanks (such as waste storage tanks). Precision motions of 0.125 inches and 0.5 degrees can easily be achieved while maneuvering loads in manual, semi-autonomous, and autonomous control modes.

New Applications

In addition to the above applications, the following applications are new to this invention.

Shipbuilding

In shipbuilding, welding, cutting, grinding, etc. equipment are continuously moved from worksite to worksite as workers need tools for performing various tasks. Tool set-up and use is cumbersome, tedious, time-consuming and equates to inefficient pre-process and process methods. The invention allows for initial set-up to achieve weld qualities necessary for fastening ship stiffeners, walls, and other structures in this variable work environment. Inherent in the invention are its adaptability, rapid set-up, calibration, and minimal re-set-up. Also, platform reconfigurability is provided for allowing reconstructability of the platform to adapt to specific applications at the site.

Aircraft Maintenance

Aircraft maintenance, for example depainting of aircraft, is currently being studied within the government and in industry. An important criteria for depainting tools is that they provide minimal damage risk to the aircraft, high dexterity and are easily controlled. The invention provides these and many more, including: suspension of tools, robots, workers, etc. from above reducing ground clutter and providing access to the fuselage, wings and tail; precision manipulation of tools in all six degrees of freedom; equipment maneuverability reducing worker fatigue and strain; site/depaint inspection with workers carried throughout the work area; relatively low expense as compared to existing dedicated facility equipment having fewer capabilities than the invention.

Laboratory/High Bay Access

Personnel and tool access throughout tall or shallow, open-center buildings (quanset-hut, warehouse, or other style) without ground supported equipment such as lifts.

Decontamination and Decommissioning of Nuclear Facilities

Personnel and tool accessibility throughout tall shallow, open-center buildings without touching potentially contaminated floors, obstacles, and/or equipment.

Various unique and significant features of the present modular, suspended manipulator are:
1. a variety of cable configurations that can provide a stable and rigid work platform that can be positioned anywhere within a large work volume;
2. a variety of cable attachment points that can support the cable configurations;
3. a modular packaging of winch components, cable routing, and tension sensors that can allow the system to be configured with a variety of cable configurations;
4. a calibration procedure that can reduce set-up time;
5. a set of tension sensors and tension control methods for damping oscillations;
6. a method for using tension control to relieve over-constrained cable configurations; and
7. a control system architecture that can permit a variety of control methods including manual control, remote teleoperation, sensor controlled motion, and computer generated motions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A modular manipulator comprising:
    a servo module having a plurality of winches, with corresponding servo axes and winch support structure, sensors, and drive mechanisms by which the winches are independently controlled,
    a support suspended from three attachment points and which can be positioned at various locations below said attachment points, said servo module mounted to said support, and
    at least six cables extending between said attachment points and said winches by which said support is suspended and positioned below the attachment points, said cables being wound up by and unwound from the winches to position the support at a selected location below said attachment points,
    wherein said servo module is one of a plurality of servo modules providing for reconfiguration of said servo axes and a variety of cable configurations, a combination of which provides the support with six degrees of freedom.

2. The modular manipulator as defined by claim 1, wherein said plurality of cables is any of six, seven, and nine cables.

3. The modular manipulator as defined by claim 1, wherein said support is a platform.

4. The modular manipulator as defined by claim 3, and further comprising a support spine extending from said platform, wherein said plurality of cables is nine cables, and wherein three of the nine cables are connected to said support spine to provide added platform constraint.

5. The modular manipulator as defined by claim 1, wherein said support is a spine and a spine bar, wherein said plurality of cables is seven cables, and wherein one cable pair from the seven cables is attached to the spine bar.

6. The modular manipulator as defined by claim 3, wherein said sensors include absolute position, velocity, and tension sensors, the tension sensors detecting cable tensions in respective cables.

7. The modular manipulator as defined by claim 6, wherein each tension sensor is disposed between said platform and a pulley about which one of said cables passes.

8. The modular manipulator as defined by claim 6, wherein each tension sensor is disposed between said winch support structure and a winch housing and senses cable tension approximately in-line with a respective one of said cables.

9. The modular manipulator as defined by claim 3, wherein said sensors include tension sensors which detect cable tensions in respective cables.

10. The modular manipulator as defined by claim 9, wherein each tension sensor is disposed between said platform and a pulley about which one of said cables passes.

11. The modular manipulator as defined by claim 9, wherein each tension sensor is disposed between said winch support structure and a winch housing and senses cable tension approximately in-line with a respective one of said cables.

12. The modular manipulator as defined by claim 6, and further comprising a controller by which the drive mechanisms are operated, wherein a set up and calibration operation is performed by:
    positioning said platform within a work volume with said cables unwound from said winches to initial cable lengths,
    setting said cable tensions so that they do not exceed a specified force while being unwound by an operator,
    connecting a first set of said cables to a first one of said attachment points,
    connecting a second set of said cables to a second one of said attachment points,
    connecting a third set of said cables to a third one of said attachment points,
    operating the winches so as to raise the platform up off a floor of said work volume,
    inputting platform angle and distance values into the controller, and
    determining a position of the platform within the work volume from said values.

13. The modular manipulator as defined by claim 9, wherein said specified force is no more than a five pound force.

14. The modular manipulator as defined by claim 1, wherein said drive mechanisms include, for each cable, a winch motor and a brake, and further comprising a computer which reads a desired load velocity and signals from said sensors, combines the desired load velocity with said signals, and computes commands for said winch motor and said brake.

15. The modular manipulator as defined by claim 14, wherein said commands are commands required to produce a desired winch velocity.

16. The modular manipulator as defined by claim 1, wherein said attachment points are disposed on any of walls, ceilings, support structures, cranes, bridges, and radio towers.

17. The modular manipulator as defined by claim 4, wherein a tool is attached to an end of said support spine so as to be maneuverable into close tolerance areas.

18. The modular manipulator as defined by claim 5, wherein a tool is attached to an end of said support spine so as to be maneuverable into close tolerance areas.

19. The modular manipulator as defined by claim 6, and further comprising an operator interface permitting entry of operator override commands.

20. The modular manipulator as defined by claim 1, and further comprising an operator interface permitting entry of operator override commands.

* * * * *